Patented Oct. 24, 1944

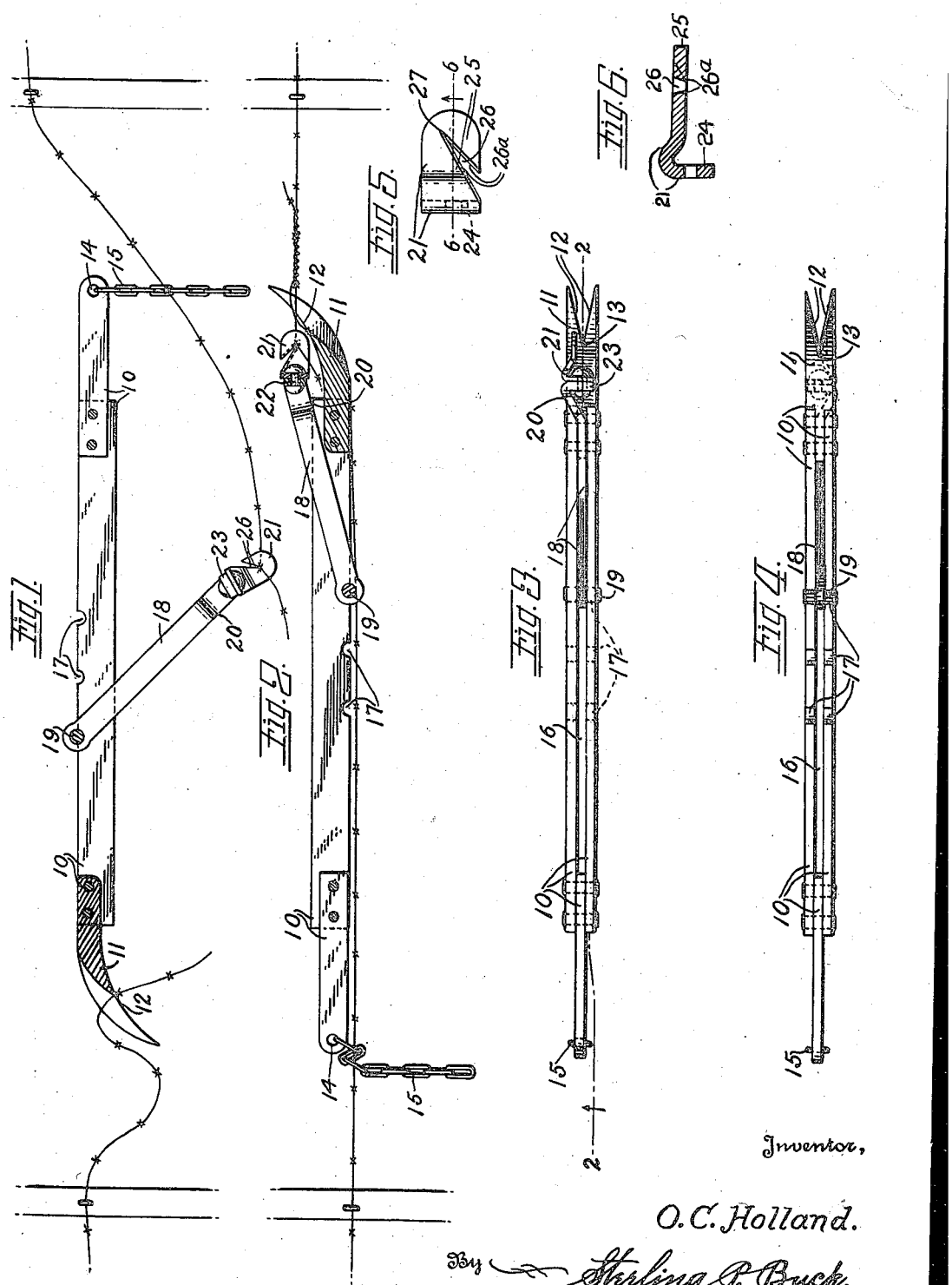

2,360,875

UNITED STATES PATENT OFFICE 2,360,875

WIRE-PULLING DEVICE

Oscar C. Holland, Dickson, Tenn.

Application September 8, 1941, Serial No. 409,971

3 Claims. (Cl. 254—77)

This invention relates to wire-stretching or wire-pulling devices, and constitutes an improvement over the invention shown in Patent No. 1,079,127 granted to my father.

There are two kinds of fence-wire that tend to untwist when being stretched, viz., the two-strand twisted barbed wire, and the helically formed single-strand springy wire that is intended to be self-tensioning. When either of these kinds of wire are being pulled or stretched by the patented invention mentioned above, the untwisting stress or torque of the wire tends to free it from the grip of one of the wire-gripping elements, thereby causing numerous interruptions in attempting to bring two ends of wires into interlapped relation so as to enable the interlapped ends to be united by any appropriate means or method. Although a swivel was provided in anticipation of such unwinding and disengagement of the wires, nothing was provided to keep the swivel out of contact with the cooperative portions of the device, and such contact rendered the swivel inoperative.

One object of the invention is to overcome the defect and disadvantage mentioned above and to provide wire-gripping devices that automatically tighten their grip in proportion to the varying degrees of pull or tension on the wires being operated on.

Another object is to reduce the number of originally separate members and thereby simplify and reduce the cost of manufacture.

Another object is to provide an improved form of wire-gripping member that also constitutes a swivel-member and is formed of sheet-metal, preferably steel, and which eliminates the two-piece wire-hook and swivel element shown in said patent.

Other objects and important advantages are pointed out or implied in the following specification, in connection with the accompanying drawing in which:

Fig. 1 is a longitudinal sectional view showing the invention connected to the ends of two barbed wires about to be drawn into substantially interlapped relation by swinging the lever or main portion to the reversed position shown in Fig. 2.

Fig. 2 is a longitudinal sectional view of the invention, showing the wires brought into substantially interlapped position and there retained by the cooperation of the invention and the stretched wires; also showing one of the wires twisted about the other as one means of splicing the wires; the section being taken along the line 2—2 of Fig. 3.

Fig. 3 is a top plan view of the invention, as when looking down on Fig. 2.

Fig. 4 is a bottom plan view, as if looking upward at Fig. 2.

Fig. 5 is a side elevation of the combined swiveling and wire-gripping member or integral unit, seen from the opposite side of that shown in Figs. 1 and 2.

Fig. 6 is a sectional view taken along the line 6—6 of Fig. 5.

Referring to the drawing by its reference-numerals of which, similar ones refer to similar parts in the several views, the invention is described in detail as follows:

The main body-member 10 constitutes a lever that is preferably but not essentially formed of several primarily separate pieces riveted together as shown, one of said pieces or members, 11, being preferably of steel having claws or furcations having hardened sharp wire-gripping edges 12 that converge to a common point or apex 13, so that when a piece of wire is pushed or pulled along the sharp edges 12, toward the point 13, it is gripped tighter and tighter in proportion to the force of the push or pull. This form of wire-gripping member is an improvement over the one shown in corresponding position in the patent referred to. At the opposite end of the lever 10, from the member 11, an aperture 14 receives a wire-engaging member 15, preferably a short length of heavy chain which, when looped or wound around the tightened wire, as in Fig. 2, serves to retain the lever 10 in its wire-stretching position while the substantially interlapped ends of the two stretched wires are being spliced. The lever 10 is provided with a longitudinal slot 16 and one or more pairs of pivot-bearings 17.

An arm 18 extends through the slot 16 and has a pivot 19 that normally rests in a pair of the bearings 17, so this arm can be swung from the position shown in Fig. 1 either to right or left with respect to the lever 10; so, when the lever 10 is swung to the inverted and reversed position of Fig. 2, by raising its apertured end at the right-hand and lowering it at the left-hand, the arm 18 automatically moves to the position shown in Figs. 2 and 3, being there stopped by an abutment 20, which latter is preferably a laterally bent portion of the arm 18 and which is in contact with the lever 10, so the pivotal extension 21 of the arm 18 is free to swivel about its pivot 22 and thereby accomplish the first-mentioned object of the invention. The pivot 22 extends through a pivot-bearing in a laterally disposed end-portion 23 of the arm 18 and through an apertured element of the member or unit 21, such apertured element being shown at 24 in Fig. 6, and its aperture constitutes a pivot-bearing. The pivot 22 has heads on its opposite ends, so it constitutes one element of the swivel, viz., a swivel-pivot.

The combined swiveling and wire-gripping member 21 includes a relatively thin and wide V-notched element 25 whose V-notch 26 is defined by sharp edges 26a that are inclined to a point 27, so they cooperate in gripping a wire as described for the edges 12. These sharp edges are only slightly acute, as shown in Fig. 6, so they present no danger of severing any wire that is being gripped and pulled thereby. In other words, the opposite sides of the V-notch not only converge longitudinally to the point 27, but also converge laterally to said point 27 and to an invisible line in space that extends from said point. This member 21 is preferably of steel and has its edges hardened so they indent the contacting surfaces of the wire being pulled thereby securely gripping without severing the wire; and because of the free swiveling of this member 21, it eliminates all danger of the gripped wire becoming either disengaged or unduly weakened as by the wire turning and peripherally grooving itself at the gripping edges 26.

It will be seen, therefore, that I have not only improved the invention patented by my father, as to its effectiveness, but have also improved it as to simplification and reduction of manufacturing cost, having reduced the number of primarily separate parts, and improved the construction of those that remain, without eliminating any previous function or advantage, while introducing a novel wire-gripping and swiveling member that is useful with different types of wire-pulling devices.

It is not my intention to limit my patent protection to the precise details of construction here shown and described, for the invention is susceptible of numerous changes within the scope of the inventive ideas as implied and claimed.

I claim the following as my invention:

1. In a device for pulling portions of wire into substantially interlapped relation, a lever provided with means at one end to grip a portion of the wire and having a manipulative end portion and an intermediate pivot-bearing, in combination with an arm having a pivot normally engaged with said pivot-bearing, and an integrally formed member that constitutes means to grip a second portion of wire and to swivel when said second portion of wire untwists, the second said means being pivotally secured on an end of said arm in proper relation to constitute a longitudinal extension of the arm, said arm being adapted to be moved about the axis of the said pivot and to carry the second said means near to the first said means, said arm being provided with an abutment adapted to cooperate with said lever to prevent the second said means from touching the first said means, so the second said means is free for swiveling.

2. In a device for pulling portions of wire into such adjacent relation that they can be spliced, a lever having means at one end to grip and pull a portion of the wire and having an intermediate pivot-bearing, in combination with an arm having adjoining portions near one end bent laterally in opposite direction to form an abutment and a swivel-element which latter is apertured to provide a pivot-bearing, said arm having a laterally projecting pivot normally seated in the pivot-bearing of said lever and being movable about the axis of said pivot so as to carry said laterally bent portions toward said means, a second pivot, and wire-gripping means secured to said swivel element by the last-said pivot in the proper relation for swiveling while it grips a second portion of said wire and thereby prevents disengagement of the latter by untwisting of the latter, said abutment being in proper position to combine with said lever for securing said wire-gripping means in narrow-spaced relation to the first said means where it is free to swivel while holding its gripped portion of wire near to the first-said portion.

3. In a member of a wire-pulling device, an integrally formed sheet-metal swivel-unit comprising two relatively wide and thin elements disposed with their wider sides substantially at right angles to one another, one of said elements being apertured to provide a hollow-cylindrical pivot-bearing whose axis is parallel to the wider side of the other one of said elements, and said other one of the said elements being formed with wire-gripping edges that define a notch which is V-shaped both longitudinally and laterally, in combination with an arm having one end provided with a pivot-bearing, and a swivel-pivot seated in the pivot-bearing of said sheet-metal unit and in the pivot-bearing of said arm and having its axis disposed along a line that extends substantially along said arm, substantially as shown.

OSCAR C. HOLLAND.